United States Patent
Chang et al.

(10) Patent No.: US 8,635,461 B2
(45) Date of Patent: Jan. 21, 2014

(54) RETRIEVAL AND DISPLAY OF ENCRYPTION LABELS FROM AN ENCRYPTION KEY MANAGER CERTIFICATE ID ATTACHED TO KEY CERTIFICATE

(75) Inventors: Shannon H. Chang, Vail, AZ (US); Khanh V. Ngo, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 1397 days.

(21) Appl. No.: 11/751,666

(22) Filed: May 22, 2007

(65) Prior Publication Data
US 2008/0294906 A1    Nov. 27, 2008

(51) Int. Cl.
*G06F 12/14*    (2006.01)
(52) U.S. Cl.
USPC ......................................... 713/193
(58) Field of Classification Search
USPC ......................................... 713/193
See application file for complete search history.

(56) References Cited

U.S. PATENT DOCUMENTS

| | | | |
|---|---|---|---|
| 5,455,409 A * | 10/1995 | Smith et al. | 235/385 |
| 5,812,883 A | 9/1998 | Rao | 395/8.94 |
| 7,023,998 B2 | 4/2006 | Garay et al. | 380/277 |
| 7,362,868 B2 * | 4/2008 | Madoukh et al. | 380/277 |
| 7,373,512 B1 * | 5/2008 | Just | 713/176 |
| 2002/0013897 A1 * | 1/2002 | McTernan et al. | 713/153 |
| 2003/0044016 A1 | 3/2003 | Nocham et al. | 380/270 |
| 2003/0105717 A1 | 6/2003 | Kim et al. | 705/50 |
| 2003/0115477 A1 | 6/2003 | Baldwin et al. | 713/193 |
| 2004/0199771 A1 | 10/2004 | Morten et al. | 713/176 |
| 2005/0228998 A1 * | 10/2005 | Chan et al. | 713/175 |
| 2006/0080534 A1 * | 4/2006 | Yeap et al. | 713/176 |
| 2008/0005564 A1 * | 1/2008 | Agarwal | 713/171 |
| 2008/0046716 A1 * | 2/2008 | Eastlake et al. | 713/156 |
| 2008/0219449 A1 * | 9/2008 | Ball et al. | 380/277 |

\* cited by examiner

*Primary Examiner* — Teshome Hailu
(74) *Attorney, Agent, or Firm* — Terrile, Cannatti, Chambers & Holland, LLP; Stephen A. Terrile (57) ABSTRACT

A method, system and program in which a certificate identifier (ID) is associated with an encryption certificate. In certain embodiments, the certificate ID is stored in a cartridge memory (CM). Thus, keystore or key manager administrators can trace keystore locations, versions of keystores, etc. when a cart cannot locate a correct key. This certificate ID, as it is stored on the cartridge memory, is viewable by all.

6 Claims, 5 Drawing Sheets

RETRIEVAL AND DISPLAY OF ENCRYPTION LABELS FROM AN ENCRYPTION KEY MANAGER CERTIFICATE ID ATTACHED TO KEY CERTIFICATE

BACKGROUND OF THE INVENTION

1. Field of the Invention

The present invention relates to encrypting information on a storage cartridge and more particularly to attaching an identifier to a key certificate when encrypting information.

2. Description of the Related Art

Protecting and securing data is an important concern to be addressed when designing information management systems. It is common for data to be continually archived on various storage media, such as tape cartridges or optical disks. When archiving data on tape or other removable storage medium, one security concern is that the tape could be stolen to access the data it contains. Also, if the tape can be mounted into a tape drive through remote commands transmitted over a network, then there is a concern that someone may compromise the system, mount the tape or other storage medium in a drive, and then access the data.

Known approaches to addressing these issues have included encrypting all or most of the data on the storage media. However, these approaches also have drawbacks that include security weaknesses, implementation challenges, and unwieldy complexity. For example, conventional solutions that store the data encryption key in unencrypted form on the same tape as the data it encrypts allow anyone with physical access to the tape to retrieve the data key from the tape and use it to decrypt the data. Furthermore, use of a single key to encrypt all of the data on one or more tape cartridges allows whoever has use of the key to decrypt all of the data comprising the tape cartridge, including data that doesn't belong to the user. Alternatively, multiple data keys can be stored on the tape drive, but key management becomes complicated when using multiple tape drives, as each tape drive has to be able to store all keys that are in use by all tape cartridges in the tape storage library. In addition, using multiple keys for one or more cartridges can lead to a proliferation of keys as the number of authorized users, tape drives, and tape cartridges grows. Known encryption systems also maintain the encryption and decryption keys in a central location, and the management and transfer of large numbers of such encryption keys can create additional issues.

One approach to addressing these issues is to encrypt the data keys and store them on the tape cartridge itself. For example, when a tape drive requests an encryption key, a random symmetric data key (DK) is generated by an external key manager (EKM). Public/private cryptographic operations are then performed by the EKM to wrap the DK using a key encryption key (KEK), which is typically the public key of an asymmetric key pair. The wrapped data key, along with key label information about what private key is required to unwrap the symmetric key, forms an envelope generally known as an encryption encapsulated data key (EEDK). The EEDK is then typically stored in one or more places on the tape cartridge along with the data it encrypts. To facilitate key management, it is common to implement an encryption policy that assigns a key label, or alias, to a tape cartridge volume serial number (VOLSER) range encrypted by the EEDK. When an encrypted tape is to be read, the tape drive sends the EEDK to the EKM that contains its decryption key. The EKM determines from the EEDK's key label which private key from its keystore to use to unwrap the EEDK and recover the DK. Once the DK is recovered, it is then wrapped with a different key and sent to the tape drive, which decrypts the DK. The tape drive then decrypts the encrypted data on the tape cartridge using the decrypted DK. Similarly, a valid key label for the tape cartridge's VOLSER is retrieved if the tape is to be appended with encrypted data. Once retrieved, the same process is followed to decrypt the EEDK to retrieve the correct DK to encrypt the appended data. However, if multiple EKMs are implemented, each EKM has to be accessed to determine whether it produced the EEDK referenced by its key label.

One issue relating to encrypting the data keys is that different certificates can have the same alias (whether they are in same EKM caused by versioning or different EKM), thus potentially confusing management of keys. Having the same certificates with different alias can also confuse management of certificates. This can create confusion if keystores, certificates and items like cartridges that contain aliases are not organized.

SUMMARY OF THE INVENTION

A method, system and program are disclosed in which a certificate identifier (ID) is attached to a certificate. In certain embodiments, the certificate ID is stored in a cartridge memory (CM). Thus, keystore or key manager administrators can trace keystore locations, versions of keystores, etc. when a cart cannot locate a correct key. This certificate ID, as it is stored on the cartridge memory, is viewable by all (i.e., is generally accessible).

Such a system is generally not prone to human error. Additionally, such a system also provides an organized and efficient method for tracking the correct keystores and their corresponding certificates. Also, such a system can help prevent confusion of aliases, which can save both time and resources. Additionally, such a system can be more secure as this information does not contain information about the key.

More specifically, in one embodiment the invention relates to a method for facilitating access to encryption information. The method comprises generating an encryption certificate; associating the encryption certificate with a certificate identifier; and, saving the certificate identifier and an alias to a non-volatile memory.

In another embodiment, the invention relates to a data storage device. The data storage device includes a read/write drive for reading data from and writing data to a storage medium housed in a data storage cartridge loaded in the data storage drive; and a controller coupled to the read/write drive. The controller facilitates access to encryption information stored on the data storage cartridge by: generating an encryption certificate; associating the encryption certificate with a certificate identifier; and, saving the certificate identifier and an alias to a non-volatile memory.

In another embodiment, the invention relates to a storage system for enabling secure access to data in a removable storage cartridge. The storage system includes a key manager for generating a data key; a tape storage library for generating a list of a plurality of key labels provided by the key manager; a tape drive for securely receiving the data key from the key manager and for encoding data with the data key to form encoded data; and a removable storage cartridge for storing the encoded data, the encrypted data key and the certificate identifier in locations on the removable storage cartridge. The plurality of key labels have a corresponding plurality of certificate identifiers where the corresponding plurality of certificate identifiers facilitate retrieval of an appropriate data key.

BRIEF DESCRIPTION OF THE DRAWINGS

Selected embodiments of the present invention may be understood, and its numerous objects, features and advantages obtained, when the following detailed description is considered in conjunction with the following drawings, in which.

DETAILED DESCRIPTION

Various illustrative embodiments of the present invention will now be described in detail with reference to the accompanying figures. It will be understood that the flowchart illustrations and/or block diagrams described herein can be implemented in whole or in part by dedicated hardware circuits, firmware and/or computer program instructions which are provided to a processor of a general purpose computer, special purpose computer, or other programmable data processing apparatus to produce a machine, such that the instructions (which execute via the processor of the computer or other programmable data processing apparatus) implement the functions/acts specified in the flowchart and/or block diagram block or blocks. In addition, while various details are set forth in the following description, it will be appreciated that the present invention may be practiced without these specific details, and that numerous implementation-specific decisions may be made to the invention described herein to achieve the device designer's specific goals, such as compliance with technology or design-related constraints, which will vary from one implementation to another. While such a development effort might be complex and time-consuming, it would nevertheless be a routine undertaking for those of ordinary skill in the art having the benefit of this disclosure. For example, selected aspects are shown in block diagram form, rather than in detail, in order to avoid limiting or obscuring the present invention. In addition, some portions of the detailed descriptions provided herein are presented in terms of algorithms or operations on data within a computer memory. Such descriptions and representations are used by those skilled in the art to describe and convey the substance of their work to others skilled in the art. Various illustrative embodiments of the present invention will now be described in detail below with reference to the figures.

Figure 1:
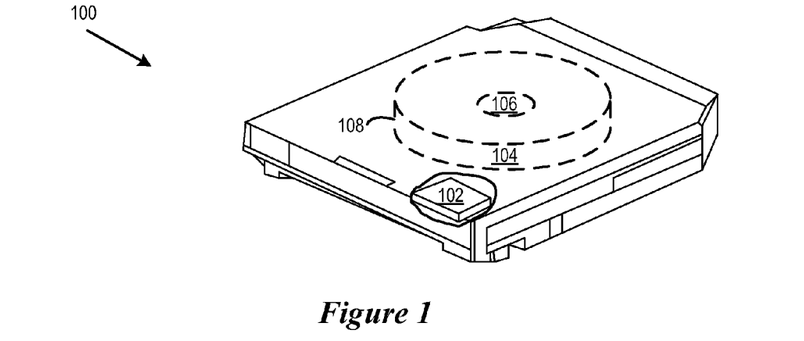
FIG. 1 illustrates a data storage cartridge with a cartridge memory and a tape medium.

Referring to FIG. 1, a data storage cartridge 100 is illustrated which includes a non-volatile read/writable cartridge memory (CM) circuit 102 (shown in cutaway) and a rewritable storage media 108, such as a high capacity single reel of magnetic tape (shown in phantom) wound on a hub 106 of a reel 104. The cartridge memory 102 is a passive storage device that includes a transponder that provides a contactless interface, and is used to hold information about that specific cartridge, the medium in the cartridge, and the data on the medium. Examples of magnetic tape cartridges comprise a cartridge based on LTO (Linear Tape Open) technology, such as the IBM TotalStorage LTO Ultrium Data Cartridge, and a cartridge based on IBM's 3592 technology, such as the IBM 3592 Enterprise Tape Cartridge. As will be appreciated, the tape cartridge 100 may be a magnetic tape cartridge having dual reel cartridges (in which the tape is fed between reels within the cartridge) or single reel cartridges, such as illustrated in FIG. 1, in which the media 108 is wound on a reel 104 within the cartridge 100. For example, when the cartridge 100 is loaded, the tape is fed between the cartridge reel and a take up reel (not shown). While exemplary tape cartridges based on the LTO and 3592 formats have been described, it will be appreciated that the description is not limited by tape format. Examples of other tape formats include DLT, SDLT, 9840, 9940, T100000, AIT and the like. Additionally, while the description provided herein is with reference to magnetic tape cartridges, it will be appreciated that data storage cartridges may be implemented with magnetic tape, optical tape, optical or magnetic disk, or other forms of rewritable storage media. Likewise, some tape formats do not include cartridge memories (e.g., 3590), while others have a cartridge memory requiring contact (e.g., AIT).

Figure 2:
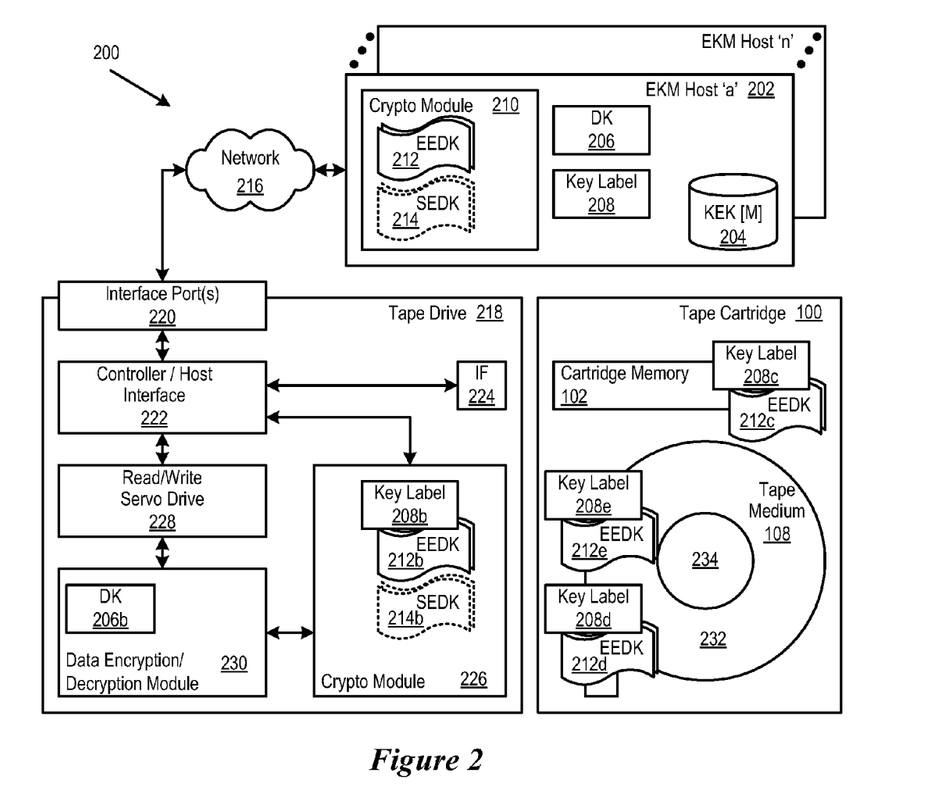
FIG. 2 is a generalized block diagram of a computing environment in which a tape cartridge and tape drive are implemented.

Referring to FIG. 2, a computing environment is illustrated in which a tape cartridge 100 and tape drive 218 are implemented in combination with an external key manager (EKM) 202 as a cartridge handling system 200. It will be appreciated that the external key manager may be a host computer (acting alone or in combination with a proxy control unit), a key management appliance (acting alone or in combination with a proxy library), or the like. One example implementation of such a cartridge handling system 200 would be a magnetic tape data storage system formed from the combination of an IBM 3592 Model E05 Encrypting Tape Drive and the IBM 3592 Enterprise Tape Cartridge subsystem.

In the illustrated example, the EKM/host system 202 includes a host application (not shown), such as a backup program, that transfers data to the tape drive 218 to sequentially write to the tape cartridge 100, such as by using the Small Computer System Interface (SCSI) tape commands to communicate I/O requests to the tape drive 218, or any other data access command protocol known in the art. As will be appreciated, the EKM/host system 'a' 202 may be constructed from one or more servers (e.g., the EKM may reside on one server and any application which is reading and writing data to the drive may reside on another server). Similarly, multiple EKMs (e.g., EKM 'a' through EKM 'n') 202 may be implemented for redundancy, distribution of work load, or for other reasons. However implemented, the EKM/host(s) 202 includes data key generation functionality for generating a data key (DK) 206 for use in performing data encryption, though this functionality may also be provided in the drive 218 or even externally to the system 200. In addition, the EKM/host 202 includes a public key crypto module 210 that is used to form a session encrypted data key (SEDK) 214 from the data key 206, and then to securely pass the SEDK 214 to the tape drive 218 as part of a secure key exchange. The public key crypto module 210 also securely encrypts the DK 206 to form one or more EEDKs 212 (as indicated by the stacked keys). In various embodiments, the public key crypto module 210 uses a predetermined public key encryption technique (such as RSA or ECC) to generate EEDK(s) 212 from DK(s) 206. For example, the public part of a public/private key pair that is retrieved from a key store 204 (which may or may not reside locally with EKM/host 202) may be used to wrap the data key 206 into its encrypted EEDK form. The encrypted EEDK form includes not only the encrypted data key DK itself, but also other structural information, such as a key label 208, which identifies the public/private key pair that is used to wrap the data key 206. Once a public key from the key store 204 is used to generate an EEDK 212, the identifying structural information in the EEDK 212 (e.g., the key label 208) can be later used by the key module 210 or EKM 202 as an index or reference to the public/private key pair in the key store 204 to retrieve the private key from the key store 204 when the EEDK 212 needs to be processed to unwrap the DK 206.

The tape drive 218 may connect with the host 202 through a direct interface (such as an SCSI, Fibre Channel (FCP), etc., in the case that the tape drive 218 is connected to the host 202) or may connect over a data channel or network 216 (such as a Local Area Network (LAN), Storage Area Network (SAN), Wide Area Network (WAN), the Internet, an Intranet, etc.). It will be appreciated that the tape drive 218 may be enclosed within the host system 202 or may be a standalone unit or in a tape library system (not shown), which may include one or more tape drives, one or more storage units to store multiple tape cartridges, and a mechanical system (commonly referred to as an accessor) to transfer the tape cartridges between the storage unit(s) and the tape drive(s). As illustrated, the tape drive 218 includes a memory circuit interface (IF) 224 for reading information from, and writing information to, the cartridge memory 102 of the data storage cartridge 100 in a contactless manner. In addition, a read/write servo drive system 228 is provided for reading information from, and writing information to, the rewritable tape media 108. The read/write servo drive system 228 controls the movement of a servo head (not shown) relative to the magnetic tape medium 108 by moving the magnetic tape medium 108 across the servo head at a desired velocity, and stops, starts and reverses the direction of movement of the magnetic tape.

A control system (or controller) 222 in the tape drive 216 communicates with the memory interface 224 and the read/write system servo drive 228. To receive commands and exchange information for operating the cartridge handling system 200, the controller 222 also acts as a host interface to communicate over one or more ports 220 with one or more external key management (EKM) subsystems 202 (such as a host computer, library or external key management appliance). In addition, a crypto module 226 and data encryption/decryption module 230 are provided in the tape drive 218 for securely encrypting and storing data to the tape cartridge 100 and for securely retrieving and decrypting data stored on the tape cartridge 100. In operation, the data encryption/decryption module 230 performs the actual data encryption and decryption (such as by using the Advanced Encryption Standard encryption algorithm) using a data key having any desired key length (e.g., 128 or 256-bit data key length), and may also perform other encoding functions, such as data compression and decompression and data buffering. The crypto module 226 controls the data encryption/decryption module 230 by securely exchanging data key (DK) 206$b$ and its associated key label 208$b$ using the SEDK 214$b$ which is received from the EKM 202 (where it is originally generated as SEDK 214). At the crypto module 226, the DK 206$b$ is extracted from the SEDK 214$b$, and is sent to the data encryption/decryption module 230 where it is used to encode/decode the input data stream. In addition, the crypto module 226 assembles, validates, distributes, stores and retrieves one or more associated EEDK(s) 212$b$ (where the letter suffix "b" in the reference numeral indicates that the EEDKs 212 and 212$b$ are logically identical, though physically distinct copies). While the modules 226, 230 may be implemented with any desired combination of hardware and/or software, the data encryption/decryption module 230 may be implemented with an ASIC or FPGA circuit, while the crypto module 226 may be implemented with one or more drive firmware modules that include a microprocessor and microcode stored in a code memory.

As described herein, the cartridge handling system 200 performs a variety of functions, including but not limited to, encrypting data to be stored on the cartridge 100 using a data key (such as an AES encryption key); using public key cryptography techniques to wrap the data key to form one or more encrypted data keys; writing and reading the encrypted data and encrypted data key(s) to and from the tape cartridge media; and unwrapping the encrypted data key such that the unwrapped key can decrypt the stored encrypted data. In this way, the cartridge handling system 200 provides a distributed key store which allows different user's data to be separately and uniquely encrypted on a single tape cartridge 100. For example, at least a first EEDK 212 is generated for local use by using a public key of the local key manager to wrap the data key 206, and the EEDK 212 is then transferred via the tape drive 218 (where it may be temporarily stored as 212$b$) for storage on the tape cartridge 100 at one or more predetermined locations, as indicated at 212$c$, 212$d$ and 212$e$. As a result, the transferred EEDK 212$b$ may be stored in the cartridge memory 102 and/or one or more non-user data areas of the tape media 108, such as a read-in area 232 or an end of tape area 234. Although only a single copy of the EEDK 210 is required to be stored on the tape cartridge 100, security and reliability are enhanced by using one or more non-user areas 232, 234 of the tape 108 to store multiple (e.g., three or more) copies of the EEDK 212, thereby allowing deletion of the EEDKs 212, 212$b$ at the EKM 202 and tape drive 218. Since the only non-volatile copies of the EEDKs are stored within the tape cartridge 100, multiple copies of the EEDKs (212$c$, 212$d$, 212$e$, etc.) provide multiple ways to access the EEDK(s) and thus the data key 206 in the cases where one or more copies of the EEDKs cannot be read or otherwise processed due to errors or degraded media or drive conditions.

When a plurality of EEDKs 212 are generated from a single data key 206—such as when a second EEDK is generated for a remote user (e.g., a business partner) by using a public key of the remote user to wrap the data key 206—the plurality of EEDKs 212, and their associated key labels 208, are transferred via the tape drive 218 for storage on the tape cartridge 100 at one or more locations (as indicated by the copies of the EEDKs 212$c$, 212$d$ and 212$e$ that are stored in one or more non-user data areas 232, 234 of the tape media 108 and/or the cartridge memory 102). By storing multiple EEDKs on the tape cartridge 100 in specially designated locations (such as the cartridge memory 102 or outside of the tape's user data area), the tape cartridge 100 can have one EEDK wrapped for local use and another for remote exchange. In theory, any number of different EEDKs could be stored, provided there is storage space for them.

Figure 3:
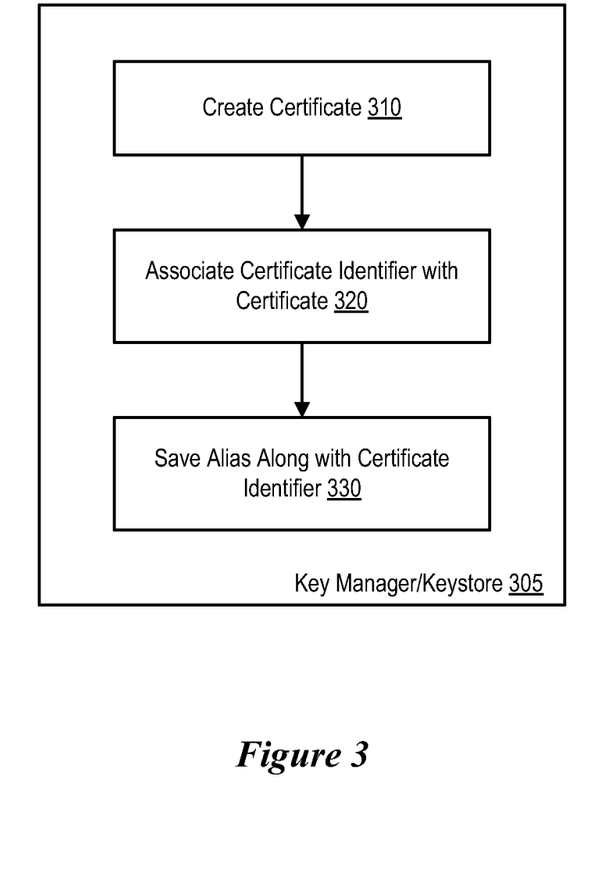
FIG. 3 is a logical flowchart of the operation of associating a certificate identifier with a key.

FIG. 3 is a logical flowchart of the steps used to associate a certificate identifier with a key. More specifically, the process, which in one embodiment executes in conjunction with a key manager or keystore 305, starts operation by a user creating a certificate (including a key) at step 310. Next, at step 320, the keystore associates a certificate identifier (i.e., a certificate ID tag) with the certificate. The certificate identifier can include information such as a path, a date and time created or modified, and a keystore name. A user can also specify version or any company specified information that could be useful to help them identify keystore and which certificate was used in what keystore to write the cartridge.

After the certificate identifier is associated with the certificate, an alias is saved along with a certificate ID tag (on the cartridge memory). Thus, even if there is more than one certificate with a particular alias on the keystore(s), it is possible to easily determine which alias corresponds to a particular certificate.

Figure 4:
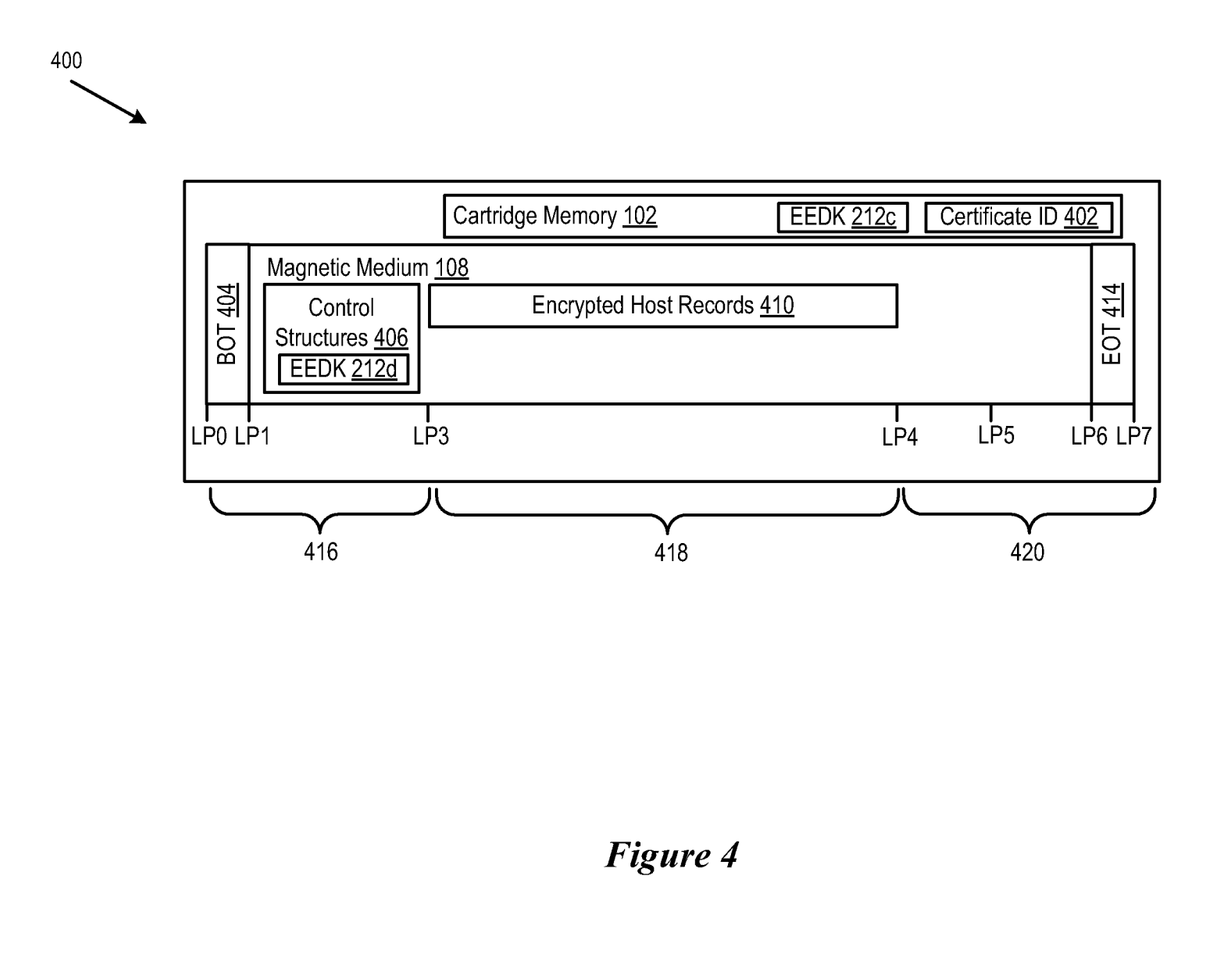
FIG. 4 is a generalized block diagram of a cartridge in which a certificate identifier is stored.

As illustrated in FIG. 4, the EEDKs 212c, 212d and the certificate ID tag 402 may be stored in multiple places by using the non-User Area parts of tape cartridge 400 to store the EEDK(s). For example, an EEDK 212c and the certificate ID tag 402 may be stored in the cartridge memory 102. In addition, the EEDK(s) and the certificate ID tag 402 may be stored in special non-user data set regions 416, 420 of the magnetic medium 108 that are designed for holding this type of information. Such tape regions include beginning of tape (BOT) 404 before the User Data area (i.e. before LP3) and end of tape (514) after it (i.e. after LP4). Thus, for each encrypted tape cartridge 400, an internal control storage area 406 is provided on magnetic medium 108 which allows the storage of EEDK structures 212d if this structure is provided by the external key manager.

When the EEDKs 212c, 212d are stored in non-user areas, the data key wrapping technology described herein may be used to change access to the encrypted data records 410 without re-encrypting the underlying data. By changing the access to the encrypted data key as described in greater detail herein, a variety of additional cartridge control features are provided, such as adding an EEDK to the cartridge, re-keying a cartridge, and shredding a cartridge. In particular, a DK can be encrypted with a first wrapping key (e.g., a public key from a public/private key pair) to form a first EEDK and then generating a first encryption policy comprising a first key label further comprising a first key mode. Subsequently, additional access to the DK can be provided by encrypting the DK with a second wrapping key to form a second EEDK and by generating a second encryption policy comprising a second key label further comprising a second key mode. With this approach, and by storing the new EEDKs outside of the user data area of the tape volume, multiple users can be added and enabled to access the encrypted data without re-encrypting the data. It will therefore be apparent that parallel access to the DK 206 (and therefore the data on the tape) is provided to anyone possessing the necessary unwrapping key (e.g., the private key from the public/private key pair) associated with any of the EEDK structures stored on the cartridge.

Another cartridge control feature is that a cartridge can be re-keyed when the KEK used to encrypt the EEDK expires or to change user access by removing a first user and adding a second user. This may be accomplished by decoding a first EEDK on the cartridge using an appropriate unwrapping key to extract the underlying data key DK, re-wrapping the DK using a different wrapping key (e.g., a new public key from a public/private key pair that belongs to a second user) to generate a new EEDK with a new key label, and re-storing the new EEDK back on the tape to overwrite the first EEDK. The result is that access is removed for anyone who previously could decode the first EEDK, while enabling access for anyone who could decode the new EEDK, all without having to re-write the data and encrypt it with a different data key.

Yet another cartridge control feature is that cartridge data access can be permanently prevented, effectively "shredding" the cartridge data. This may be accomplished by deleting or erasing the EEDK structures from the tape. Since the EEDK structures are the only repository for the data key needed to decrypt the cartridge data, the data may never be decrypted. Erasing the EEDK structures is much faster (on the order of 2-3 minutes versus 1-2 hours) and actually more secure then erasing all the data from the tape. Another advantage is that the wrapping and unwrapping keys do not need to be deleted from the key store to prevent readability of the tape, since the EEDK(s) have been deleted. Also, EEDK erasure can be performed more securely (e.g., using multiple erase passes with random patterns), more easily and more quickly then a secure erase of all encrypted data.

Figure 5:
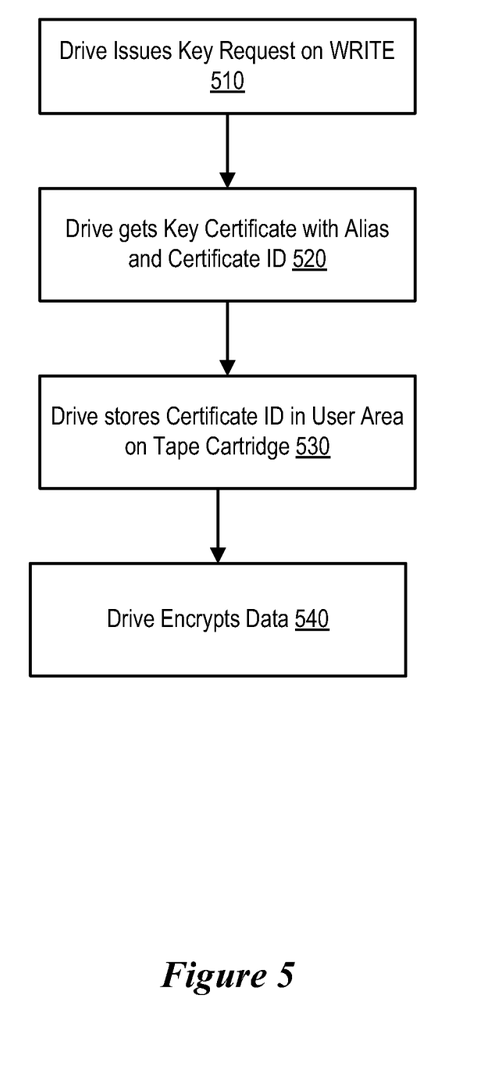
FIG. 5 is a logical flowchart of the operation of using a certificate identifier during an encryption operation.

Referring to FIG. 5, a logical flowchart of the operation of using a certificate identifier during an encryption operation is shown. More specifically, an encryption operation begins with a drive (e.g., tape drive 218) issuing a key request on a write operation at step 510. Next, the drive obtains a key certificate along with an alias as well as the certificate identifier at step 520. Next, the drive stores the certificate identifier in a user accessible area on the storage cartridge (e.g., on a tape cartridge) at step 530. The step of writing the certificate identifier can overwrite a preexisting certificate identifier. Next, at step 540, the drive encrypts the data that is being written to the storage cartridge.

Figure 6:
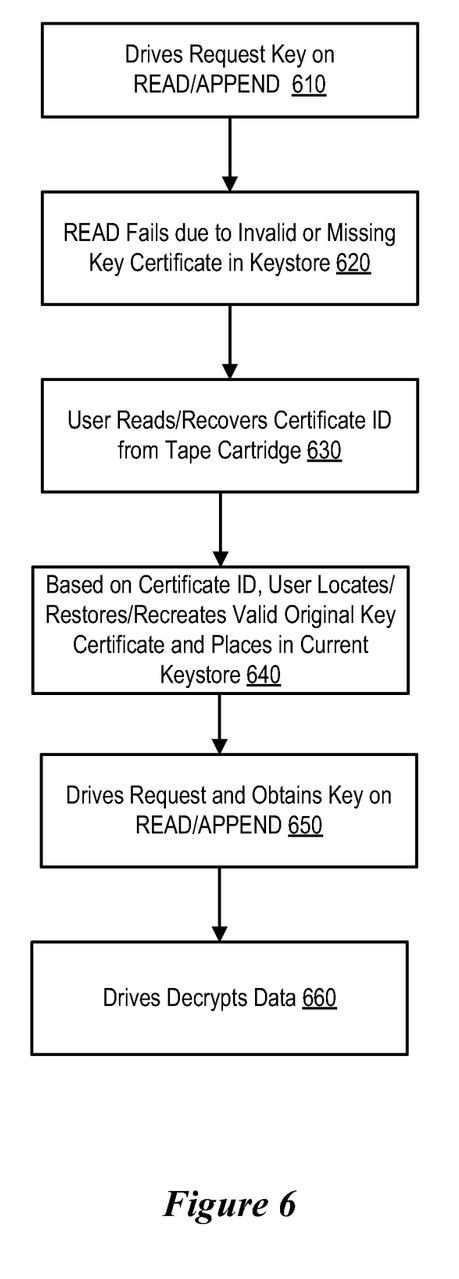
FIG. 6 is a logical flowchart of the operation of using a certificate identifier during a decryption operation.

Referring to FIG. 6, a logical flowchart of the operation of using a certificate identifier during a decryption operation is shown. More specifically, a decryption operation begins with a request by a drive for a key during a read or append operation at step 610. Next, if the read operation fails due to an invalid or missing key certificate within the keystore as determined by step 620, it then becomes necessary to obtain the missing key certificate from wherever that key certificate may now be stored (for example, from wherever the key certificates are backed up). To facilitate recovery of the missing key certificate, the user can read or recover the certificate ID that corresponds to the missing key certificate from the storage cartridge at step 630. Because the certificate ID is generally accessible, the user does not need access to a key certificate or alias to access this information. The certificate ID facilitates locating any associated key certificate or alias. Accordingly, based upon the certificate ID, the user can locate, restore and/or recreate the valid original key certificate and store this valid key certificate within the current keystore at step 640. Thus, when the drive requests the key during a read or append operation, the drive is able to obtain the key from the keystore at step 650. After obtaining the key, the drive can decrypt the data at step 660.

By providing a certificate ID as described when a key or key certificate is generated, recollection of the keystore or key or key certificate that was used to store information to a storage cartridge is facilitated. Thus, when the drive writes encrypted data to the storage cartridge, the certificate ID is also stored somewhere that is accessible by the user. This location may be within the storage cartridge or some other standard storage location that is accessible by the user.

Some time later, a user may desire access to the data that was stored on the storage cartridge. However, the keystore in which the key or key certificate was stored may have been purged in between the time when the data was written to the storage cartridge and the time that it is desired to access the data that was stored on the storage cartridge. A certificate ID can help to trigger the memory of the user to facilitate retrieval of the certificate. The certificate ID may provide the user with knowledge of what keystore was used in generating the certificate or where a backup copy of the certificate is stored or may even provide enough detail about the creation of the certificate to enable the user to search various keystores for the certificate. Thus, the certificate ID enables the user to track down the original key, which key can then be reloaded to enable access to the encrypted data.

The foregoing description has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification and example implementations provide a complete description of the manufacture and use of the composition of the invention. Since many embodiments of the invention can be made without departing from the spirit and scope of the invention, the invention resides in the claims hereinafter appended.

What is claimed is:

1. A method for facilitating access to encryption information comprising:
   generating, via a computer system, an encryption certificate;
   associating, via the computer system, the encryption certificate with a certificate identifier; and,
   saving, via the computer system, the certificate identifier and certificate identifier alias to a non-volatile memory, the certificate identifier being stored to be generally accessible so as to facilitate tracking of keystores and corresponding certificates; and wherein
   the non-volatile memory comprises a non-volatile memory location within a storage cartridge;
   the certificate identifier comprises a path identifier, date and time created or modified information, a keystore name, version information and company specific information; and,
   the non-volatile memory location with the storage cartridge comprises at least one of a cartridge memory and a data area on the storage cartridge that is not used to store encrypted data.

2. The method of claim 1 wherein:
the certificate identifier is generally accessible by a user.

3. A data storage device comprising:
   a read/write drive for reading data from and writing data to a storage medium housed in a data storage cartridge loaded in the data storage drive; and
   a controller coupled to the read/write drive, the controller facilitating access to encryption information stored on the data storage cartridge by:
      generating an encryption certificate;
      associating the encryption certificate with a certificate identifier; and,
      saving the certificate identifier and certificate identifier alias to a non-volatile memory, the certificate identifier being stored to be generally accessible so as to facilitate tracking of keystores and corresponding certificates; and wherein
   the non-volatile memory comprises a non-volatile memory location within a storage cartridge;
   the certificate identifier comprises a path identifier, date and time created or modified information, a keystore name, version information and company specific information; and,
   the non-volatile memory location with the storage cartridge comprises at least one of a cartridge memory and a data area on the storage cartridge that is not used to store encrypted data.

4. The data storage device of claim 3 wherein:
the certificate identifier is generally accessible by a user.

5. A storage system for enabling secure access to data in a removable storage cartridge, comprising:
   a key manager for generating a data key;
   a tape storage library for generating a list of a plurality of key labels provided by the key manager, the plurality of key labels having a corresponding plurality of certificate identifiers, the corresponding plurality of certificate identifiers facilitating retrieval of an appropriate data key, the plurality of certificate identifiers being stored to be generally accessible so as to facilitate tracking of keystores and corresponding certificates;
   a tape drive for securely receiving the data key from the key manager and for encoding data with the data key to form encoded data; and
   a removable storage cartridge for storing the encoded data, the data key and the certificate identifier in locations on the removable storage cartridge; and wherein
   each of the plurality of certificate identifiers comprises a path identifier, date and time created or modified information, a keystore name, version information and company specific information; and,
   the location on the removable storage cartridge comprises at least one of a cartridge memory and a data area on the storage cartridge that is not used to store encrypted data.

6. The data storage device of claim 5 wherein:
the certificate identifier is generally accessible by a user.

* * * * *